Feb. 4, 1930.  A. ALTMAN  1,745,594
FUR STRETCHING AND NAILING MACHINE
Filed Oct. 2, 1928  2 Sheets-Sheet 1
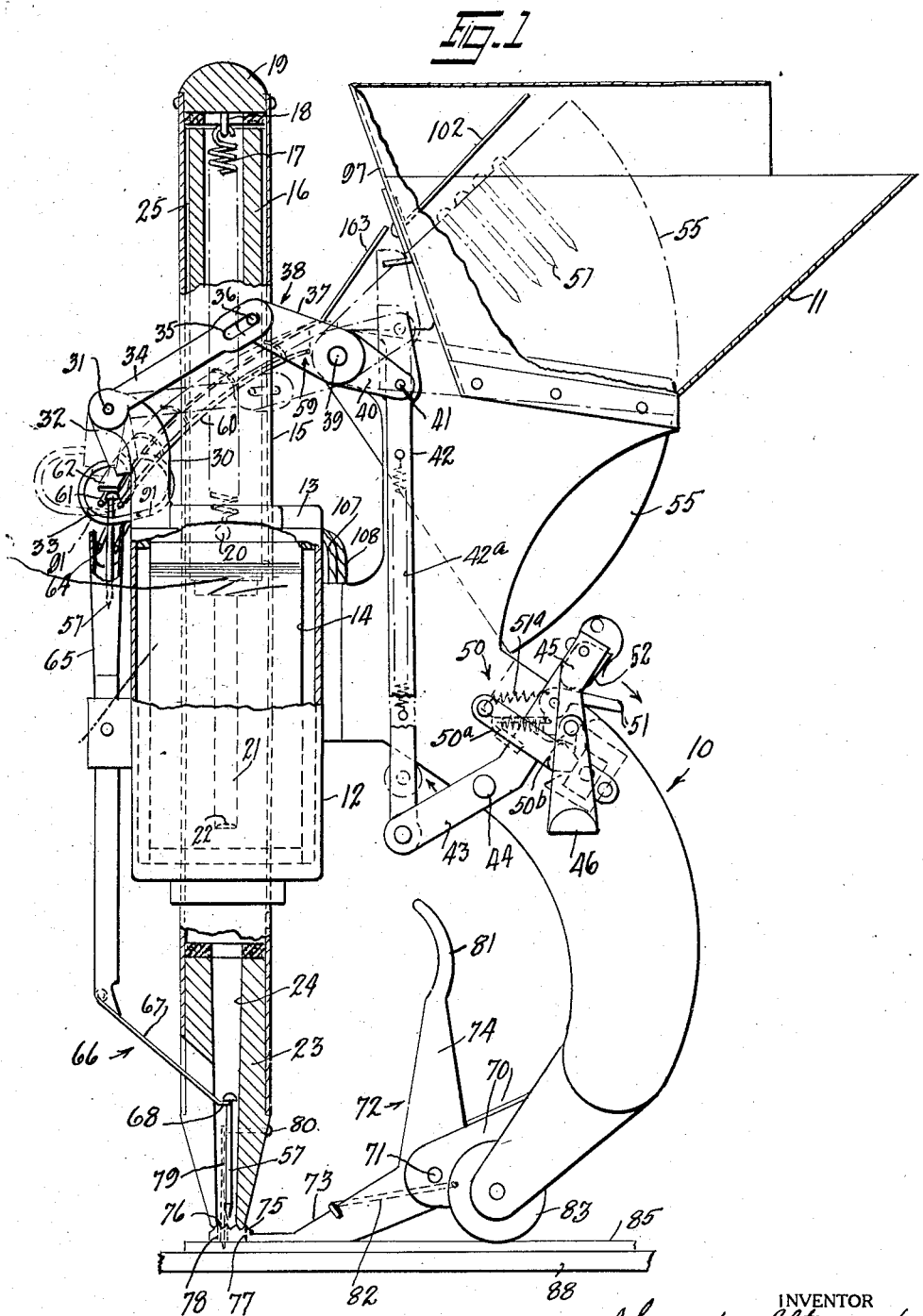
INVENTOR
Alexander Altman.
BY
ATTORNEY Feb. 4, 1930. A. ALTMAN 1,745,594
FUR STRETCHING AND NAILING MACHINE
Filed Oct. 2, 1928  2 Sheets-Sheet 2
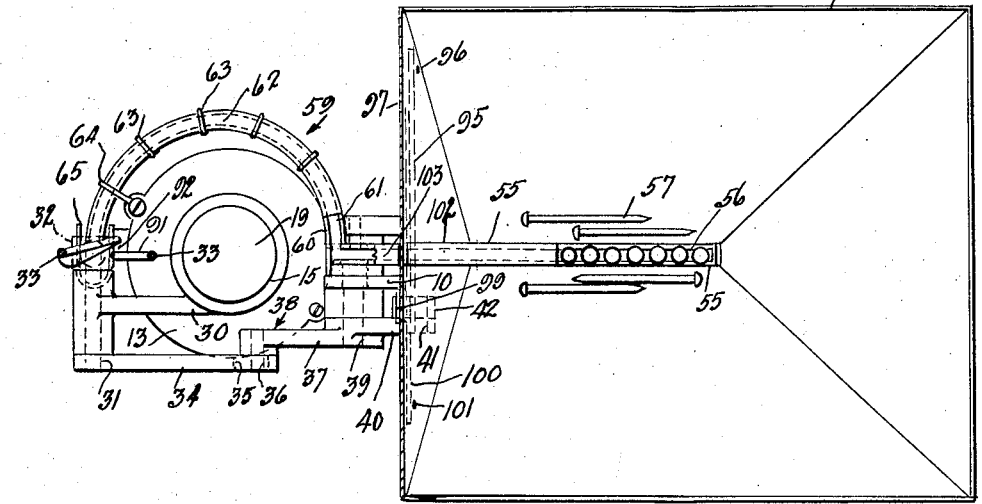
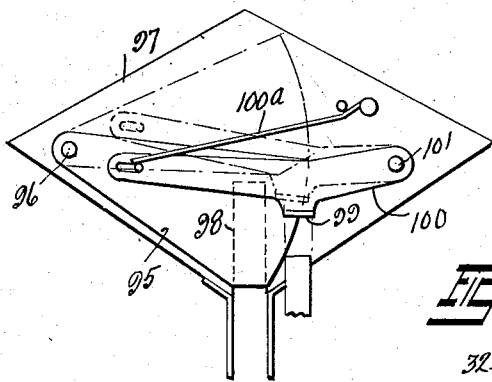
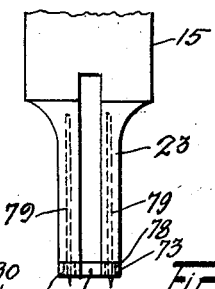
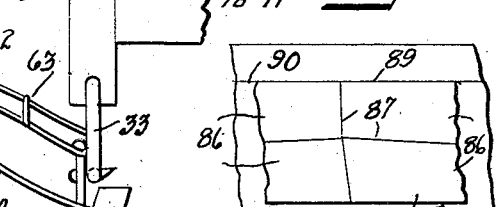
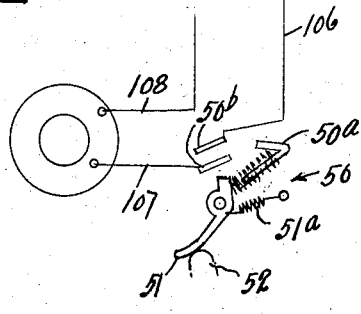
INVENTOR
Alexander Altman
BY
Maurice Block
ATTORNEY Patented Feb. 4, 1930

1,745,594

UNITED STATES PATENT OFFICE

ALEXANDER ALTMAN, OF BAYONNE, NEW JERSEY

FUR STRETCHING AND NAILING MACHINE

Application filed October 2, 1928. Serial No. 309,850.

This invention relates to improvements in combined fur nailing and stretching machines and has for one of its objects the provision of a machine of the nature referred to that will eliminate the stretching and nailing of fur by hand.

Another object of the invention is to provide a simple and efficient device that is adapted to first stretch the fur to a predetermined point and then nailing same at the said point.

A further object of the invention is to provide a device of this nature having means for automatically feeding nails and alining same in position to be struck by a hammer on the next operation of the machine.

A still further object of the invention is to provide a device of this nature with a solenoid controlled by a switch of the make and break type so that by a single operation of the said switch the solenoid will become momentarily energized and operate a hammer to make a single stroke after which the electric contact of the switch will be broken and the hammer will be returned to normal position.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described, and illustrated in the accompanying drawings, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purposes of illustration, is shown in the accompanying drawings, in which Figure 1 is a side view in elevation partly in section of one embodiment of my invention.

Fig. 2 is a top plan view of the device partly in section with some of the parts omitted for the sake of clearness.

Fig. 3 is a front view of the hopper showing the nail segment opening and the closing means therefor.

Fig. 4 is a fragmental detail view of the fur stretching portion of the device.

Fig. 5 is a fragmental detail view of a portion of the nail chute and escapement mechanisms.

Fig. 6 is a diagrammatic view of the electrical connections of the solenoid and its operating switch and Fig. 7 is a fragmental plan view of a section of fur ready to be stretched and nailed.

It is customary at the present time for furriers to nail and stretch previously prepared and dampened furs by hand with the assistance of a pair of pliers used as a hammer. This is a very lengthy and costly operation. In order to obviate this loss of time and expense, I have invented my new and improved fur stretching and nailing device.

Referring now to the drawings in detail 10 indicates a supporting frame, having secured thereto at its upper end a hopper 11, and provided at the front thereof with a hollow casing or housing 12 closed at its upper end with a cover 13. Within the casing 12 there is housed a solenoid 14 through the center of which passes a tubular casing 15 in which the core 16 of the solenoid is suspended upon a spring 17 one end of which is anchored in a hook 18 projecting from a cap 19 which closes the tubular casing 15 at its upper end, and the other end of the said spring is secured to a pin 20 in the core 16. Suitably secured to the lower end of the core 16 is a rod or hammer 21 provided at its lower end with a concave surface 22. In the lower end of the tubular housing 15 there is suitably secured a combined fur gripping and nail guiding member 23 provided with a central tapering bore 24 through which the hammer 21 is adapted to pass when the solenoid 14 is energized. The core 16 is provided with a series of grooves 25 in its peripheral surface to permit the air in the tubular members to move upwardly when the said core is actuated, to move downwardly when the solenoid is energized, thus preventing any air cushion to form in the tube 15.

Integral with the cover 13 there is a bearing post 30 in which there is rotatably journaled a short shaft 31 upon one end of which there is secured an arm 32 supporting a loop of wire 33 forming an escapement, the object of which will presently be described. At the opposite end of the shaft 31 there is suitably mounted a link 34 provided at its free end with a slot 35 in engagement with a pin 36 in one arm 37 of a lever 38 pivotally mounted on a pin or stud 39 journaled in the frame 10. The other arm 40 of the lever 38 is secured by means of a pin 41 to a link 42 in engagement with one end of an operating lever 43 pivotally mounted at 44 on the frame 10. The said operating lever 43 is provided at its opposite end with a downwardly projecting member 45 to which is suitably secured a finger piece 46. Mounted within the frame 10 and suitably insulated therefrom is a make and break switch 50 of any well known make, provided with a pivotally mounted arm 51 projecting outwardly of the said frame and in the path of a one way spring pressed latch 52 mounted on a pin 53 in the operating lever 43.

On the stud 39 there is also secured a segment 55 provided with a central opening 56 extending through substantially the entire length thereof. The said slot being wide enough to permit the shank of the nails 57 to freely enter therein, but not wide enough for the head to pass therethrough. An inclined nail guiding plane 59 commencing at the rear of the nail segment 55 and terminating at the front of the device is suitably secured to the frame 10 and to the cover 13. The said nail guiding plane comprises two parallel wires 60 and 61 suitably bent and curved (Figs. 1 and 2) and a plate 62 similarly shaped spaced above the said wires and joined to them by intermediate wire sections 63 soldered to the said plate and wires. An auxiliary nail guide wire 64 is also provided at the front of the nail guiding plane.

A nail chute 65 is provided and supported at the front of the solenoid casing 12, and is in line with the front end of the nail guiding plane and in line with and directly below the escapement loop 33. The said chute is provided at its lower end with a lower inclined nail guiding plane 66 comprising a pair of spaced spring wire members 67 which project into the bore 24 of the member 23 and terminate in short and approximately horizontal ends 67 adapted to support the head of a nail.

Between a pair of lugs or ears 70 at the bottom of the frame 10 there is pivotally mounted at 71, a bell crank lever 72, comprising a lower or horizontal arm 73 and a vertical arm 74, the first mentioned arm being provided at the front thereof with teeth 75 which are adapted to normally engage with similar teeth 76 at the bottom of the member 23. The said arm 73 is also provided with a slot 77 in alinement with the bore in the member 23, and with openings 78 in line with pins 79 secured in the said member 23 by screws 80 and the said pins project beyond the bottom of the arm 73. The arm 74 terminates in a finger piece 81. A spring 82 presses against the arm 73 and tends to normally swing the bell crank lever downwardly. The entire device may be propelled along a surface on a pair of rollers 83, only one of which is shown in the drawings, the other one being directly in line therewith but on the opposite side of the frame.

The operation of the device is as follows:

A strip of fur 85 previously moistened and made up of a plurality of sections 86 joined or sewn together along seams 87, is placed upon a board 88 with one edge 89 of the fur even with a line 90 of a design laid out upon the said board. The device is then placed either upon the fur or upon the board with the forward end of the arm 73 near the said edge 89. A nail may then be dropped into the chute 65 which will drop into the member 23 with its head resting against the surface of the bore 24 and upon pulling down the finger piece 46, the operating lever 43 will swing in the direction of the arrows (Fig. 1) and swing the nail segment 55 and the nail escapement into the dot and dash position (Fig. 1) causing the nails 57 picked up from the hopper 11 to slide down the nail guide 59 to the front of the device, the first nail stopping against the leg 91 of the escapement loop 33, the said leg then being in its forward position or directly in the path of the nail. During this operation the switch arm 51 will have been actuated by the latch 52 and caused the contact arm 50$^a$ to momentarily engage the contacts 50$^b$ close the circuit to energize the solenoid 14, pull the core and hammer down once to strike the nail and drive same into the board through the fur. As soon as the latch 52 has passed beyond the end of the switch arm 51, a spring 51$^a$ will cause the switch to break contact and the core and hammer will be drawn back to normal position by the spring 17. As soon as the finger piece 46 is released a spring 42$^a$ will return the remaining parts to normal position. During this return to normal position the first nail in the nail guide will be permitted to pass through a passageway 92 and drop into the chute into position for the next operation. It will be understood that due to the fact that the auxiliary nail guide 66 is made of spring wire the hammer will force same back when striking the nail.

During the upward movement of link 42 and the nail segment 55, the segment will come in contact with a plate 95 pivoted at 96 on a wall 97 of the hopper and lift the said plate and partly uncover an opening 98 in the said wall and as soon as the upper end of the link 42 comes in contact with a lug 99 on an arm 100 pivoted at 101 the said plate will be lifted to its dot and dash position Fig. 3, entirely uncovering the slot and permitting the nails to pass out of the segment into the nail guide. A plate 102 secured to the interior of the wall 97 and a projection 103 on the nail guide plate 62 prevents the nails from falling out of the segment when the said segment is thrown upwardly. The plate 95 normally closes the slot 98 to prevent the nail in the hopper from falling out. A spring 100ª returns the plate 95 to normal position.

After the first nail is driven into the fur the operation is repeated until one end is nailed down, after which it becomes necessary to stretch and straighten the fur at its seams and nail same in place. This is accomplished by inserting the pins 79 into the fur at or near the said seams, simultaneously stretching the fur and straightening the seams by pulling on the device, and then driving a nail through the fur and repeating the operation until the entire length of the fur has thus been stretched and nailed.

To stretch and nail the fur at its free edges, the fur is gripped at the said edges between the teeth 76 of the member 23 and the teeth 75 on the lever arm 73, the pins 79 penetrate the fur, the finger piece 81 is gripped by the thumb of the operator and the fur is pulled until it reaches a boundary line 105 to which the fur is being drawn, one of which is shown in Fig. 7 and the nails are driven in one at a time until the entire fur is stretched and nailed.

Current is supplied to the device through a lead wire 106 connected to one terminal 50ᵇ from a source of supply not shown through the contact arm 50ª when in closed position, through the opposite terminal 50ᵇ, thence through a lead wire 107 to the solenoid, through the solenoid into a lead wire 108 returning to the source of supply.

From the above it will be seen that I have provided a simple and efficient fur stretching and nailing device, positive in action and inexpensive in construction.

It will also been seen that instead of dropping the first nail through the chute by hand, I may make an idle operation of the device to automatically position the said nail.

Having described my invention what I claim as new and desire to secure by Letters Patent is:

1. A fur nailing device comprising a swingably mounted nail lifter, nail guiding means, an escapement mechanism in communication with the nail guide, operating means for swinging the nail lifter into communication with the nail guide to feed nails to the escapement mechanism during the said swinging movement, electromagnetic nail driving means, a switch controlling the operation of the nail driving means and actuated by the aforementioned operating means during a portion of its movement, and means for returning the operating means to normal position and to operate the escapement to feed a nail into position in line with the driving means.

2. A fur nailing device comprising a swingably mounted nail lifter, nail guiding means, an escapement mechanism in communication with the nail guide, operating means for swinging the nail lifter into communication with the nail guide to feed nails to the escapement mechanism during the said swinging movement, electromagnetic nail driving means, a switch controlling the operation of the nail driving means and actuated by the aforementioned operating means during a portion of its movement, a nail alining member in line with the nail driving means, and means for returning the operating means to normal position and to operate the escapement to feed the nail into the said alining member.

3. A fur nailing device comprising a swingably mounted nail lifter, nail guiding means, an escapement mechanism in communication with the nail guide, operating means for swinging the nail lifter into communication with the nail guide to feed nails to the escapement mechanism during the said swinging movement, electromagnetic nail driving means, a switch controlling the operation of the nail driving means and actuated by the aforementioned operating means during a portion of its movement, a nail alining member in line with the nail driving means, a nail chute in line with the escapement and nail guide, and means for returning the operating means to normal position to actuate the escapement to permit the nail to drop into the chute and into the nail alining member.

4. In a fur nailing device, a supporting frame, a nail hopper, a nail lifting member swingably mounted on the frame and extending into the hopper through an opening in one wall thereof, a nail guide, electromagnetic nail driving means, a plate normally closing the opening in the hopper wall, means for actuating the nail driving means, swinging the nail lifting member into communication with the guide and for simultaneously lifting the closing plate to permit the nails to enter the nail guide, and an escapement associated with the nail guide to permit a single nail to drop into alinement with the driving means.

5. In a device of the nature described, a swingingly mounted nail lifter, nail guiding means in operative communication therewith, means for feeding nails through the said guiding means to a predetermined point thereon, a nail timing escapement in communication therewith, a nail chute in alinement with one end of the said guiding means, nail driving means, a member having a nail alining chamber therein in line with the guiding means, means for operating the escapement to drop a single nail into the chute, an auxiliary resilient nail guide at the bottom of the chute entering the alining chamber, fur gripping and stretching means in alinement therewith, and means for driving the nail out of the auxiliary guide through the fur.

6. In a device of the nature described, nail guiding means, means for feeding nails through the said guiding means to a predetermined point thereon, a nail timing escapement in communication therewith, a nail chute in alinement with one end of the said guiding means, nail driving means, a member having a nail alining chamber therein in line with the guiding means, means for operating the escapement to drop a single nail into the chute, an auxiliary resilient nail guide at the bottom of the chute entering the alining chamber, fur gripping and stretching means, comprising a pivotally mounted toothed lever, teeth on the alining member in line with the teeth on the lever, pins projecting from the alining member through openings in the lever, and means for operating the nail driving member while the fur is so gripped.

7. In combination with a nailing device having a handle and a base, a nail alining member, and pins projecting downwardly from said member and extending through openings in the base, as and for the purpose described.

In testimony whereof I hereunto affix my signature.

ALEXANDER ALTMAN.